United States Patent
Endo et al.

(10) Patent No.: US 12,172,706 B2
(45) Date of Patent: Dec. 24, 2024

(54) MOTOR CONTROL DEVICE, MOTOR CONTROL METHOD, MOTOR MODULE, AND ELECTRIC POWER STEERING DEVICE

(71) Applicant: Nidec Corporation, Kyoto (JP)

(72) Inventors: Shuji Endo, Kyoto (JP); Sohei Miyake, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 261 days.

(21) Appl. No.: 17/949,348

(22) Filed: Sep. 21, 2022

(65) Prior Publication Data

US 2023/0100977 A1    Mar. 30, 2023

(30) Foreign Application Priority Data

Sep. 29, 2021 (JP) ................. 2021-160026
Sep. 29, 2021 (JP) ................. 2021-160027
Dec. 28, 2021 (JP) ................. 2021-214767

(51) Int. Cl.
    *B62D 5/04*    (2006.01)
(52) U.S. Cl.
    CPC ......... *B62D 5/0463* (2013.01); *B62D 5/0409* (2013.01); *B62D 5/0424* (2013.01); *B62D 5/046* (2013.01)
(58) Field of Classification Search
    CPC .... B62D 5/0409; B62D 5/0424; B62D 5/046; B62D 5/0463; B62D 5/0472
    USPC .................................................. 701/41, 42
    See application file for complete search history.

(56) References Cited

U.S. PATENT DOCUMENTS

| | | | | |
|---|---|---|---|---|
| 2009/0000857 A1* | 1/2009 | Sugiyama | ............ | B62D 5/0472 180/444 |
| 2009/0192679 A1* | 7/2009 | Kobayashi | ........... | B62D 5/0472 701/42 |
| 2010/0004824 A1* | 1/2010 | Ikeda | .................. | B62D 5/0463 701/42 |
| 2010/0235047 A1* | 9/2010 | Kurishige | ............ | B62D 5/0472 701/41 |
| 2011/0054740 A1* | 3/2011 | Kurishige | ............ | B62D 5/0463 701/42 |
| 2018/0111642 A1 | 4/2018 | Endo | | |
| 2019/0100234 A1* | 4/2019 | Kezobo | ................. | B60W 10/20 |

FOREIGN PATENT DOCUMENTS

| | | |
|---|---|---|
| JP | 06-219310 A | 8/1994 |
| JP | 2005-088610 A | 4/2005 |
| WO | 2016/208665 A1 | 12/2016 |

* cited by examiner

*Primary Examiner* — Erick R Solis
(74) *Attorney, Agent, or Firm* — Keating & Bennett, LLP (57) ABSTRACT

A motor control device includes a model following controller to generate a correction torque based on an output from a control target that is a motor, and correct an input to the control target with the correction torque. A model following controller includes a high-pass filter with a first cutoff frequency and a low-pass filter with a second cutoff frequency larger than the first cutoff frequency, and is configured or programmed so that a transfer function of a control target is constrained to a nominal model in a frequency band in which a gain in a gain characteristic of Q(s)·HPF(s) is 1 where Q(s) is a transfer function of the low-pass filter and HPF(s) is a transfer function of the high-pass filter.

6 Claims, 10 Drawing Sheets

MOTOR CONTROL DEVICE, MOTOR CONTROL METHOD, MOTOR MODULE, AND ELECTRIC POWER STEERING DEVICE

CROSS-REFERENCE TO RELATED APPLICATIONS

The present application claims priority under 35 U.S.C. § 119 to Japanese Patent Applications No. 2021-160026 and 2021-160027, filed on Sep. 29, 2021, and Japanese Patent Application No. 2021-214767, filed on Dec. 28, 2021, the entire contents of which are incorporated herein by reference.

1. Field of the Invention

The present disclosure relates to a motor control device, a motor control method, a motor module, and an electric power steering device.

2. Background

A general automobile has an electric power steering device (EPS) including an electric motor (hereinafter, referred to simply as a "motor") and a motor control device. The electric power steering device is a device that assists a driver's steering wheel operation by driving the motor. In the related art, the motor output according to a steering torque is realized by torque control, thereby assisting a steering wheel operation.

Conventionally, a technique related to disturbance observer control is known. A robust controller for reducing the influence of a disturbance or a parameter variation of a control target on steering control is conventionally used. A conventional resonance point disturbance controller including a disturbance observer is used to suppress a resonance point disturbance excited at a resonance point of a suspension in a front-rear direction. There is also known a technique for generating an appropriate steering reaction force without discomfort according to a road surface reaction force by eliminating a friction torque generated by internal friction of a steering mechanism.

It is desirable to improve the steering feeling that the driver can feel when assisting the steering wheel operation of the driver.

In recent years, market demands for noise, vibration, and harshness (NVH), for which there is one standard used for evaluation of comfort of automobiles, have become increasingly strict. However, the conventional torque control is particularly susceptible to a high frequency disturbance and cannot suppress high frequency torque fluctuations, and thus it is difficult to meet market demands.

In the related art, a friction model as a function of an angular velocity $\omega$ of a motor is constructed, and friction compensation control is performed using the constructed model. However, in general friction characteristics, there is a problem that chattering is likely to occur because the sign of the friction torque is rapidly inverted around the time when the angular velocity $\omega$ of the motor is zero.

SUMMARY

In a non-limiting example embodiment of the present disclosure, a control device is applicable for use an electric power steering device including a motor. The control device controls the motor and includes a model following controller to generate a correction torque based on an output from a control target that is the motor and that corrects an input to the control target with the correction torque. The model following controller includes a high-pass filter with a first cutoff frequency and a low-pass filter with a second cutoff frequency higher than the first cutoff frequency, and is configured or programmed so that a transfer function of the control target is constrained to a nominal model in a frequency band in which a gain in a gain characteristic of $Q(s) \cdot HPF(s)$ is 1 where $Q(s)$ is a transfer function of the low-pass filter and $HPF(s)$ is a transfer function of the high-pass filter.

In a non-limiting example embodiment of the present disclosure, a motor module includes a motor and the control device described above.

In a non-limiting example embodiment of the present disclosure, an electric power steering device includes the motor module described above.

In a non-limiting example embodiment of the present disclosure, a control method is a computer-implemented method for controlling a motor of an electric power steering device including the motor. The method includes generating a correction torque based on an output from a control target and correcting an input to the control target with the correction torque using a model following controller that constrains a transfer function of the control target that is the motor to a nominal model in a frequency band in which a gain in a gain characteristic of $Q(s) \cdot HPF(s)$ is 1, the model following controller including a high-pass filter with a first cutoff frequency and a low-pass filter with a second cutoff frequency larger than the first cutoff frequency, where $Q(s)$ is a transfer function of the low-pass filter and $HPF(s)$ is a transfer function of the high-pass filter.

The above and other elements, features, steps, characteristics and advantages of the present disclosure will become more apparent from the following detailed description of the example embodiments with reference to the attached drawings.

DETAILED DESCRIPTION

With reference now to the accompanying drawings, example embodiments of motor control devices mounted on electric power steering devices of the present disclosure, motor control methods, motor modules including the control devices, and electric power steering devices including the motor modules will be described in detail. However, needlessly detailed descriptions may be omitted. For example, detailed descriptions of well-known matters and duplicate description of substantially the same configuration may be omitted. This is because of avoiding the following description redundant more than necessary and facilitating the understanding of a person skilled in the art.

The following example embodiments are merely examples, and a motor control device mounted on the electric power steering device according to the present disclosure and a motor control method are not limited to the following example embodiments. For example, the numerical values, the steps, the order of the steps, and the like illustrated in the following example embodiments are only illustrative, and various modifications can be made unless any technical inconsistency occurs. The example embodiments or examples described below are merely examples, and various combinations are possible as long as no technical contradiction occurs.

Figure 1:
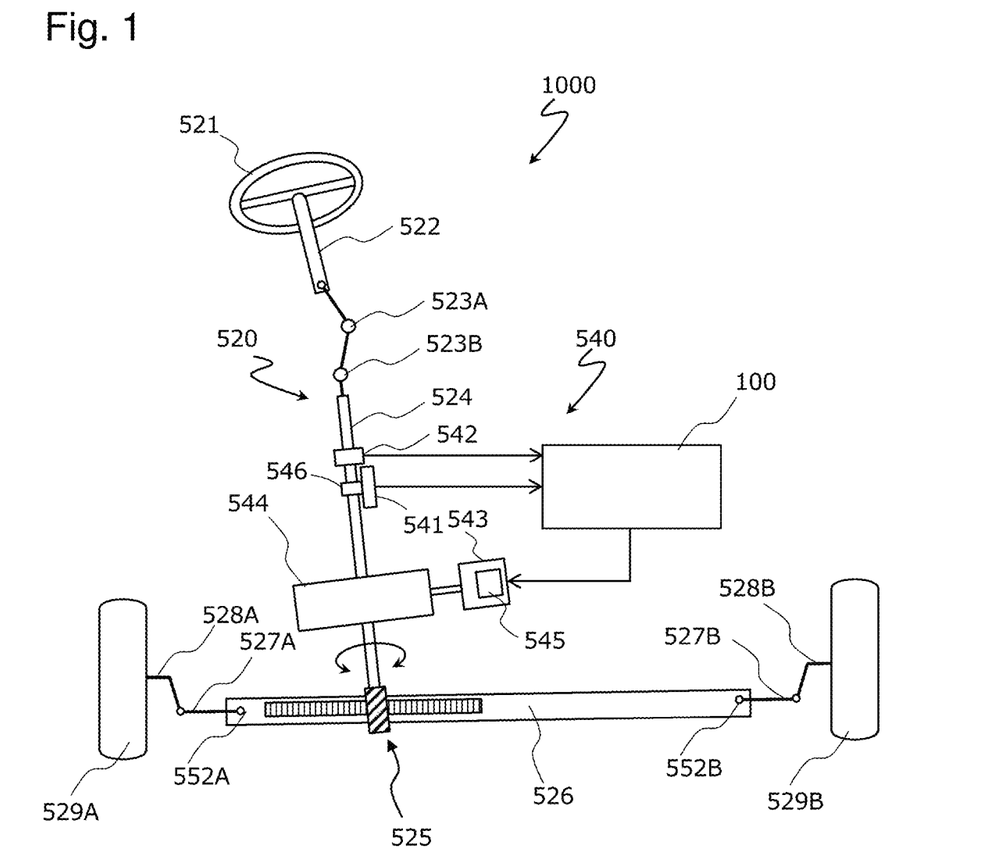
FIG. 1 is a diagram schematically illustrating a configuration example of an electric power steering device according to an example embodiment of the present disclosure.

FIG. 1 schematically illustrates a configuration example of an electric power steering device 1000 according to the example embodiment of the present disclosure.

The electric power steering device 1000 (hereinafter, referred to as an "EPS") includes a steering system 520 and an assist torque mechanism 540 which generates an assist torque. The EPS 1000 generates the assist torque for assisting the steering torque of the steering system generated when a driver operates a steering wheel. The assist torque reduces an operation load on the driver.

The steering system 520 includes, for example, a steering wheel 521, a steering shaft 522, universal joints 523A and 523B, a rotation shaft 524, a rack-and-pinion mechanism 525, a rack shaft 526, left and right ball joints 552A and 552B, tie rods 527A and 527B, knuckles 528A and 528B, and left and right steered wheels 529A and 529B.

The assist torque mechanism 540 includes a steering torque sensor 541, a steering angle sensor 542, an automobile electronic control unit (ECU) 100, a motor 543, a deceleration gear 544, an inverter 545, and a torsion bar 546, for example. The steering torque sensor 541 detects a steering torque in the steering system 520 by detecting the amount of torsion of the torsion bar 546. The steering angle sensor 542 detects a steering angle of the steering wheel. Incidentally, the steering torque may be an estimated value derived from calculation, not a value of the steering torque sensor. The steering angle can also be calculated based on the output value of the angle sensor.

The ECU 100 generates a motor driving signal based on the detection signals detected by the steering torque sensor 541, the steering angle sensor 542, a vehicle speed sensor (not illustrated) mounted on a vehicle, and the like to output the motor driving signal to the inverter 545. For example, the inverter 545 converts direct-current power into three-phase alternating-current power having U-phase, V-phase, and W-phase pseudo sine waves in accordance with the motor driving signal and supplies the power to the motor 543. The motor 543 is, for example, a surface permanent-magnet synchronous motor (SPMSM) or a switched reluctance motor (SRM), and is supplied with the three-phase alternating-current power to generate assist torque according to the steering torque. The motor 543 transmits the generated assist torque to the steering system 520 via the deceleration gear 544. Hereinafter, the ECU 100 will be referred to as a control device 100 for the EPS.

The control device 100 and the motor are modularized and manufactured and sold as a motor module. The motor module includes the motor and the control device 100 and is suitably used for the EPS. Alternatively, the control device 100 may be manufactured and sold as a control device for controlling the EPS independently of the motor.

Figure 2:
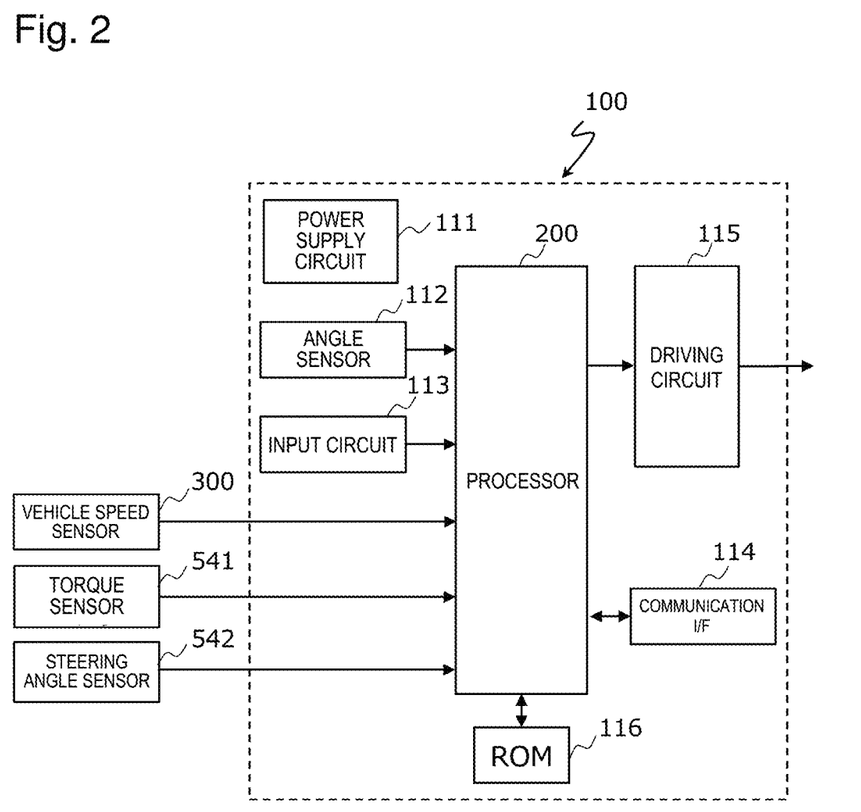
FIG. 2 is a block diagram illustrating a typical example of a configuration of a control device according to an example embodiment of the present disclosure.

FIG. 2 illustrates a typical example of the configuration of the control device 100 according to the example embodiment of the present disclosure. The control device 100 includes a power supply circuit 111, an angle sensor 112, an input circuit 113, a communication I/F 114, a driving circuit 115, a ROM 116, and a processor 200, for example. The control device 100 can be realized as a printed circuit board (PCB) on which these electronic components are implemented. The control device 100 is used to control a motor of an electric power steering device including the motor.

A vehicle speed sensor 300, the steering torque sensor 541, and the steering angle sensor 542 mounted on the vehicle are communicably connected to the processor 200, and the vehicle speed, the steering torque, and the steering angle are transmitted from the vehicle speed sensor 300, the steering torque sensor 541, and the steering angle sensor 542 to the processor 200, respectively.

The control device 100 is electrically connected to the inverter 545 (see FIG. 1). The control device 100 controls switching operations of a plurality of switching elements (for example, MOSFETs) included in the inverter 545. Specifically, the control device 100 generates a control signal (hereinafter referred to as a "gate control signal") for controlling the switching operations of the respective switching elements to output the gate control signal to the inverter 545.

The control device 100 generates a torque command value based on the steering torque or the like, and controls the torque and the rotation speed of the motor 543 by, for example, vector control. The control device 100 can perform not only the vector control but also other closed-loop control. The rotation speed is expressed by the number of revolutions (rpm) at which a rotor rotates per unit time (for example, one minute) or the number of revolutions (rps) at which the rotor rotates per unit time (for example, one second). The vector control is a method in which current flowing through the motor is separated into a current component that contributes to generation of a torque and a current component that contributes to generation of a magnetic flux, and the current components orthogonal to each other are independently controlled.

The power supply circuit 111 is connected to an external power source (not illustrated) and generates DC voltage required for each block in the circuit. The DC voltage to be generated is, for example, 3 V or 5 V.

The angle sensor 112 is, for example, a resolver or a Hall IC. Alternatively, the angle sensor 112 is also realized by a combination of an MR sensor having a magnetoresistive (MR) element and a sensor magnet. The angle sensor 112 detects a rotation angle of the rotor to output the rotation angle to the processor 200. The control device 100 may include a speed sensor and an acceleration sensor that detects the rotation speed and acceleration of the motor instead of the angle sensor 112. The processor 200 can calculate the angular velocity ω [rad/s] based on the electrical angle $\theta_m$ of the motor.

The input circuit 113 receives a motor current value (hereinafter, referred to as an "actual current value") detected by a current sensor (not illustrated), converts a level of the actual current value into an input level for the processor 200 as needed, and outputs the actual current value to the processor 200. A typical example of the input circuit 113 is an analog-digital conversion circuit.

The processor 200 is a semiconductor integrated circuit and is also referred to as a central processing unit (CPU) or a microprocessor. The processor 200 sequentially executes a computer program which is stored in the ROM 116 and describes a command set for controlling motor driving, and realizes desired processing. In addition to or instead of the processor 200, the control device 100 includes a field programmable gate array (FPGA), a graphics processing unit (GPU), an application specific integrated circuit (ASIC), or an application specific standard product (ASSP) on which a CPU is mounted, or a combination of two or more circuits selected from these circuits. The processor 200 sets a current command value according to the actual current value, the rotation angle of the rotor, and the like, generates a pulse width modulation (PWM) signal, and outputs the PWM signal to the driving circuit 115.

The communication I/F 114 is an input/output interface configured to transmit and receive data in conformity with an in-vehicle control area network (CAN), for example.

The driving circuit 115 is typically a gate driver (or a pre-driver). The driving circuit 115 generates a gate control signal in accordance with the PWM signal and gives the gate control signal to gates of the plurality of switching elements included in the inverter 545. There is a case where a gate driver is not necessarily required when a driving target is a motor that can be driven at a low voltage. In this case, the processor 200 may have the function of the gate driver.

The ROM 116 is electrically connected to the processor 200. The ROM 116 is a writable memory (for example, a PROM), a rewritable memory (for example, a flash memory or an EEPROM), or a read-only memory, for example. The ROM 116 stores a control program including a command set for causing the processor 200 to control motor driving. For example, the control program is temporarily expanded in a RAM (not illustrated) at the time of booting.

Figure 3:
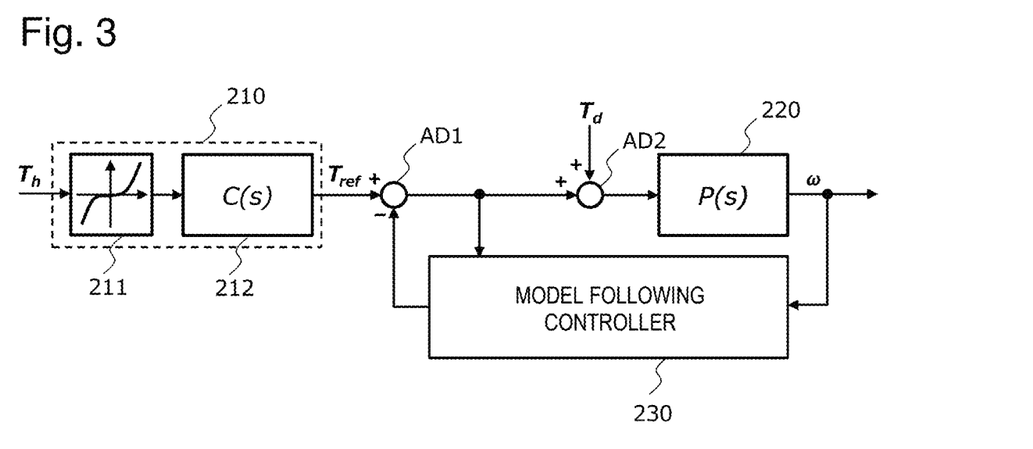
FIG. 3 is a functional block diagram illustrating a function of a processor for controlling a motor according to an example embodiment of the present disclosure.

FIG. 3 illustrates functional blocks of the processor 200 for controlling the motor according to the example embodiment of the present disclosure. In the illustrated implementation example, the processor 200, which is a computer, sequentially executes processing (or tasks) necessary for controlling the motor by using a torque controller, a model following controller, a subtractor, and an adder.

Each functional block is implemented in the processor 200 as software (or firmware) and/or hardware. The processing of each functional block is typically described in a computer program in units of software modules and stored in the ROM 116. However, in a case where an FPGA or the like is used, all or some of the functional blocks may be implemented as hardware accelerators. The motor control method according to the example embodiment of the present disclosure is implemented in a computer, and can be implemented by causing the computer to execute a desired operation.

The control device 100 includes a torque controller 210, a model following controller 230, a subtractor AD1, and an adder AD2. In other words, functions corresponding to the torque controller 210, the model following controller 230, the subtractor AD1, and the adder AD2 are implemented in the processor 200.

The torque controller 210 operates based on a steering torque $T_h$ and gives an input to a control target 220 that is a motor. For example, the steering torque $T_h$ detected by the steering torque sensor 541 is input to the torque controller 210. The torque controller 210 generates a target motor torque (or torque command value) $T_{ref}$ by applying phase compensation to the steering torque $T_h$ when the steering frequency or the steering speed is within a predetermined range, and inputs the target motor torque $T_{ref}$ to the control target 220.

The torque controller 210 illustrated in FIG. 3 includes a base assist calculation unit 211 and a phase compensator 212.

The base assist calculation unit 211 acquires the steering torque $T_h$ and the vehicle speed. The base assist calculation unit 211 generates a base assist torque based on the steering torque $T_h$ and the vehicle speed. For example, the base assist calculation unit 211 can include a look-up table (LUT) that defines a correspondence between the steering torque $T_h$, the vehicle speed, and the base assist torque. The base assist calculation unit 211 can determine the base assist torque having a correspondence relationship based on the steering torque $T_h$ and the vehicle speed with reference to the LUT. Furthermore, the base assist calculation unit 211 can determine the base assist gain based on the slope defined by the ratio of the change amount of the base assist torque to the variation amount of the steering torque $T_h$.

The phase compensator 212 in the example embodiment of the present disclosure adjusts the assist gain within a range of the steering frequency when the driver operates the steering wheel, and compensates for the rigidity of the torsion bar. In the example embodiment of the present disclosure, an example of the predetermined range is 5 Hz or less. The phase compensator 212 may apply, for example, first-order phase compensation to the steering torque (torsion torque) when the steering frequency is 5 Hz or less. The first-order phase compensation is expressed by, for example, a transfer function of the mathematical expression of Math. 1.

$$C(s) = \frac{\frac{1}{2\pi f_1}s + 1}{\frac{1}{2\pi f_2}s + 1}$$ [Math. 1]

where s is a Laplace transformer, $f_1$ is a frequency (Hz) of the zero point of the transfer function, and $f_2$ is a frequency (Hz) of the pole of the transfer function. A graph in which the gain (or loop gain) is set as a vertical axis and the logarithm of the frequency is set as a horizontal axis is referred to as a gain diagram. In the gain diagram, the zero point means the intersection of the gain curve and the horizontal axis indicating 0 dB, and the pole means the maximum point of the gain curve. For example, by setting the pole frequency to be higher than the zero point frequency, a phase lead compensation can be applied. The longer the distance between the frequencies is, the larger the amount of phase lead is.

The phase compensator 212 generates a target motor torque $T_{ref}$ based on the base assist torque and the base assist gain output from the base assist calculation unit 211. For example, the phase compensator 212 may be a stabilization compensator and apply stability phase compensation to the base assist torque. The phase compensator 212 may have a second-order or higher transfer function whose frequency characteristic is variable according to the base assist gain. The second-order or higher transfer function is expressed using a responsiveness parameter $\omega$ and a damping parameter $\zeta$. The second-order or higher transfer function can be expressed by, for example, the mathematical expression of Math. 2. By setting the order number of the transfer function to two, damping can be given to the characteristic of the transfer function. A phase characteristic can be adjusted by changing the damping.

$$C(s) = \frac{s^2 + 2\zeta_1 \omega_1 s + \omega_1^2}{s^2 + 2\zeta_2 \omega_2 s + \omega_2^2} \left( \frac{\omega_2^2}{\omega_1^2} \right) \quad \text{[Math. 2]}$$

where s is a Laplace transformer, $\omega_1$ is a zero point frequency, $\omega_2$ is a pole frequency, $\zeta_1$ is zero point damping, and $\zeta_2$ is pole damping. The pole frequency $\omega_2$ is lower than the zero point frequency $\omega_1$.

The model following controller 230 is configured to estimate the disturbance torque based on the angular velocity $\omega$ (MR angular velocity) of the motor, which is the output from the control target 220, calculate the estimated disturbance torque, and feed back the estimated disturbance torque to the input to the control target 220. The torque fed back from the model following controller 230 to the input to the control target 220 corresponds to a "correction torque" for correcting the input to the control target 220. The model following controller 230 generates the correction torque based on the output of the control target 220. An example of the model following controller 230 is a model following controller configured to perform model following control. A specific configuration of the model following controller 230 will be described in detail later.

The subtractor AD1 subtracts the estimated disturbance torque output from the model following controller 230 from the target motor torque $T_{ref}$. The output from the subtractor AD1 is input to the adder AD2 and the model following controller 230. The adder AD2 adds the disturbance torque $T_d$ to the output from the subtractor AD1 to output the result to the control target 220. Here, examples of the disturbance in the example embodiment of the present disclosure include friction caused by a mechanism such as a motor or a deceleration gear, a torque ripple or a rattling, a self-aligning torque, or a disturbance that may occur when the vehicle travels on an unpaved rattling road or gravel road. Here, the self-aligning torque means a torque that acts in a direction in which the steering wheel returns by the elasticity of the tire that is twisted when the steering wheel is turned.

The model following controller has an inverse plant model, a high-pass filter and a low-pass filter (or Q filter). The model following controller is configured so that the transfer function P(s) of the control target is constrained to the nominal model $P_n(s)$ in a frequency band in which a gain in a gain characteristic of Q(s)·HPF(s) is 1 where Q(s) is a transfer function of the low-pass filter and HPF(s) is a transfer function of the high-pass filter. Note that, in the present specification, "the transfer function of the control target is constrained to the nominal model" means that, for example, the control target is controlled such that the transfer function of the control target appears to be a transfer function of the nominal model in appearance when the input/output relationship is viewed.

Figure 4:
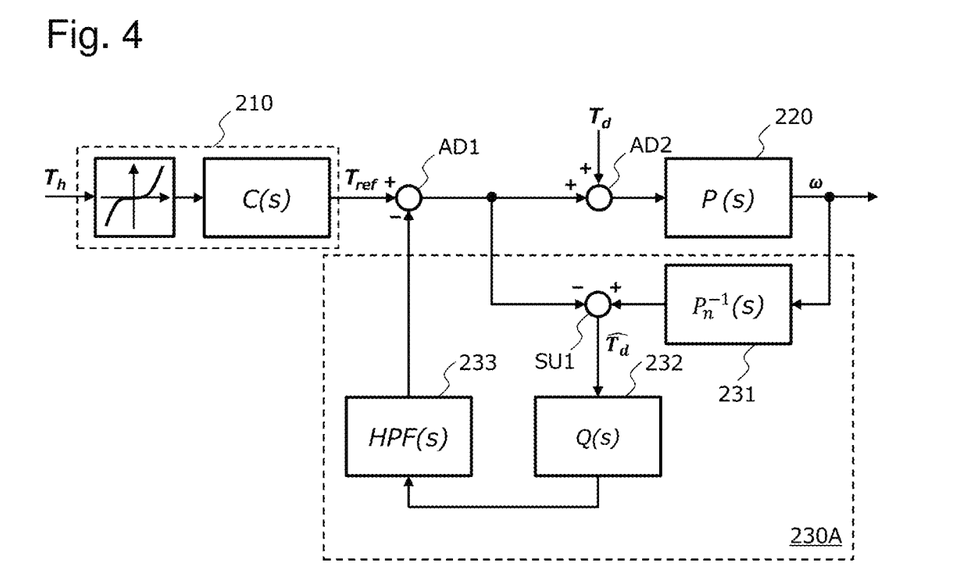
FIG. 4 is a functional block diagram illustrating a configuration example of a model following controller in the first implementation example.

FIG. 4 illustrates a configuration example of a model following controller 230A in the first implementation example. The model following controller 230A includes a control target inverse model 231, a low-pass filter 232, a high-pass filter 233, and a subtractor SU1. The high-pass filter 233 has a first cutoff frequency, and the low-pass filter 232 has a second cutoff frequency.

The angular velocity $\omega$ of the motor is input to the control target inverse model 231. The subtractor SU1 subtracts the output of the subtractor AD1 from the output of the control target inverse model 231 to generate an estimated disturbance torque $\hat{T}_d$. The estimated disturbance torque $\hat{T}_d$ is subjected to a filtering process by the low-pass filter 232 and the high-pass filter 233 coupled in series in this order, and is input to the subtractor AD1. As described above, the model following controller 230A feeds back the estimated disturbance torque $\hat{T}_d$ to the input to the control target 220. Note that "$\hat{T}_d$" means $T_d$ with a hat illustrated in FIGS. 4 and 12.

The model following controller 230A executes model following control that means a feedback loop using the angular velocity $\omega$ of the motor, which is the control target 220, for an outer loop of current control. In the first implementation example, the torque ripple depending on the angular velocity $\omega$ can be compensated by the feedback loop formed by the model following controller 230A. The signal of the angular velocity $\omega$ used for the control can be corrected for each type of the motor, and the accuracy of the signal of the angular velocity $\omega$ can be improved as compared with the current signal and the like. As a result, torque ripple compensation with high accuracy can be applied to torque control.

The model following controller 230A is structurally similar to a conventional disturbance estimator (or disturbance observer), but has different actions and effects. The conventional disturbance estimator estimates the disturbance torque by selecting the inverse plant model to a value close to the plant model, adjusts the disturbance torque in advance, and reduces the influence of the disturbance. The frequency band to be compensated is a low frequency of 4 Hz or less that which may be generated by the behavior of the vehicle.

The model following control according to the example embodiments of the present disclosure uses the effect of the feedback loop constraining the plant to the nominal model defined in the inverse plant model. A frequency band to be compensated is about 4 Hz to 150 Hz, which is different from a frequency band of a conventional disturbance estimator. For example, when the inverse plant model is defined so that there is no torque ripple, the plant model is constrained to the characteristic without torque ripple by the model following control, and as a result, the torque ripple can be reduced by applying torque ripple compensation. In addition, by constructing an inertia or viscosity model and constraining the plant model to the model, a reduction in inertia or viscosity of the plant model can be realized. By performing the model following control, for example, the lost torque compensation or the motor inertia compensation is performed in addition to the compensation of the torque ripple of the motor.

In the present specification, the control target 220, the nominal model (or a plant model) used to constrain the control target 220, the control target inverse model 231 defined by an inverse plant model of the plant model, the transfer function of the low-pass filter 232, and the transfer function of the high-pass filter 233 are described as P(s), $P_n(s)$, $P_n^{-1}(s)$, Q(s), and HPF(s), respectively.

The plant model (nominal model) is expressed by the mathematical expression of Math. 3, and the inverse plant model is expressed by the mathematical expression of Math. 4. By appropriately setting $J_{mn}$ and $B_{mn}$, a desired frequency characteristic can be given to P(s) of the control target 220. In the present example embodiment, the plant model (nominal model) is a model of a one-inertia system.

$$\frac{1}{J_{m_n}s + B_{m_n}} \quad \text{[Math. 3]}$$

$$J_{m_n}s + B_{m_n} \quad \text{[Math. 4]}$$

A complementary sensitivity function of the inner loop configured by the model following controller is defined as T(s), and a modeling error of the plant model is defined as $\Delta$(s). T(s) is expressed by Q(s) HPF(s), and the relationship shown in Math. 5 is established with respect to $\Delta$(s). The robust stability of the model following controller is secured when the small gain theorem expressed by the mathematical expression of Math. 6 holds between T(s) and $\Delta$(s). In order to suppress disturbance, it is sufficient when T(s)=1, but in consideration of robust stability, it is necessary to satisfy the mathematical expression of Math. 6. As understood from this, disturbance suppression and robust stability are not compatible.

$$P(s) = \frac{1}{J_{m_n}s + B_{m_n}}(1 + \Delta(s)) \quad \text{[Math. 5]}$$

$$|T(j\omega)| < \frac{1}{|\Delta(j\omega)|} \text{ or } |T(j\omega)\Delta(j\omega)| < 1, \forall s = j\omega \quad \text{[Math. 6]}$$

Figure 5:
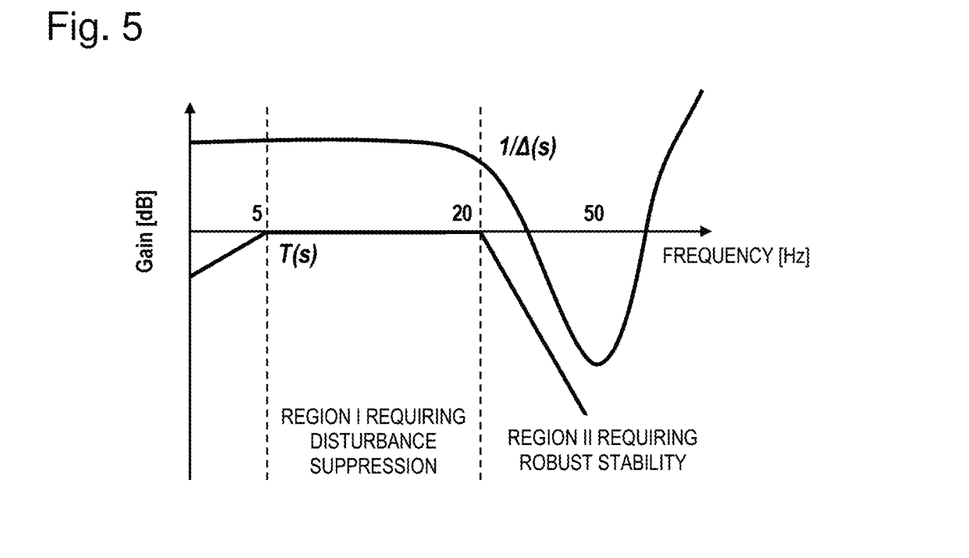
FIG. 5 is a graph illustrating a gain characteristic $T(s)$ of $Q(s) \cdot HPF(s)$ and a gain characteristic of a reciprocal of a modeling error $\Delta(s)$ between a plant and a nominal model $P_n(s)$.

FIG. 5 illustrates a gain diagram of a transfer function of the entire steering system. In the gain diagram, the horizontal axis represents the frequency [Hz] and the vertical axis represents the gain [dB]. In the first implementation example, in order to realize the disturbance suppression by the frequency band, the frequency band is divided into a region I in which the disturbance suppression is necessary and T(s)=1, and a region II in which T(s) is lowered to ensure the robust stability. In the region II, $1/\Delta(s)>T(s)$ holds.

The gain characteristic of the transfer function of the entire steering system has peaks around 20 Hz and around 50 Hz, for example, and the modeling error appears at a peak around 50 Hz of the two peaks. That is, $\Delta$(s) has a peak around 50 Hz, and $1/\Delta$(s) shown in FIG. 5 has a bottom around 50 Hz. As a gain characteristic adjustment method, there are adjustment of $1/\Delta$(s) and adjustment of a break point of T(s). The adjustment of $1/\Delta$(s) is performed by adjusting $J_{mn}$ and $B_{mn}$ of the plant model, and the adjustment of the break point of T(s) is performed by adjusting the second cutoff frequency of the low-pass filter 232. Furthermore, the sensitivity to disturbance can be adjusted by the steering assist amount, the steering speed, or the vehicle speed. In a case where the frequency of the bottom of the modeling error is close to the frequency of the boundary between the region I and the region II, as a countermeasure, a method of raising the order of the low-pass filter 232 to sharply lower T(s) in the region I where disturbance suppression is necessary is often used.

The control device 100 performs torque control on a low-frequency torque signal and performs control such that the angular velocity $\omega$~0 on a high frequency disturbance, thereby realizing stabilization of steering so that the uncontrollable steering wheel is generated. In order to achieve this object, the control device 100 decreases the high frequency gain of the torque control using the torque controller 210, and constrains the control target P(s) to the characteristic in which the high frequency gain decreases using the model following controller 230A. The reason for performing the latter process is to prevent the control target 220 from reacting to a disturbance such as $T_d$ illustrated in FIG. 4 when the disturbance is input to the control target 220.

Figure 6:
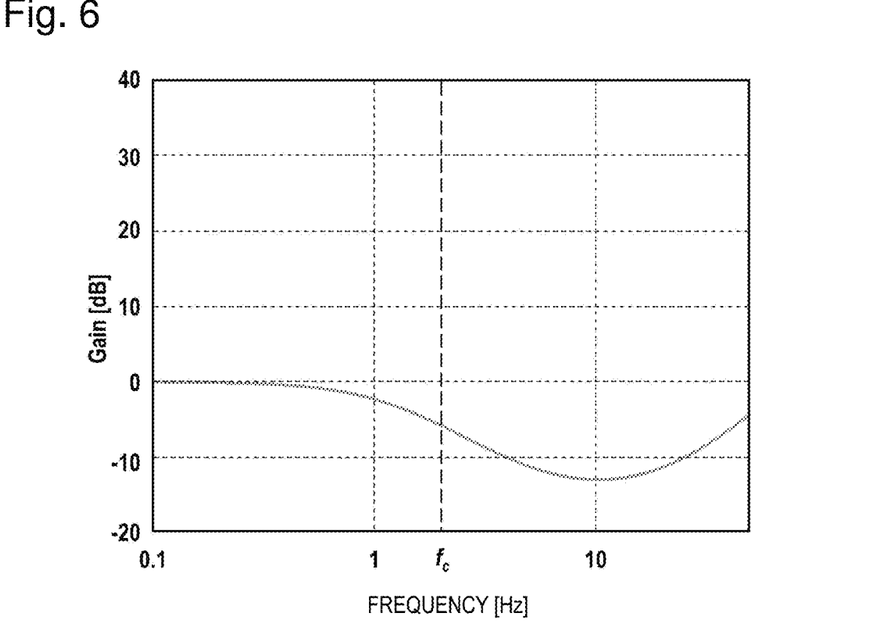
FIG. 6 is a graph illustrating a gain diagram of a transfer function $C(s)$ of a phase compensator in a torque controller.
Figure 7:
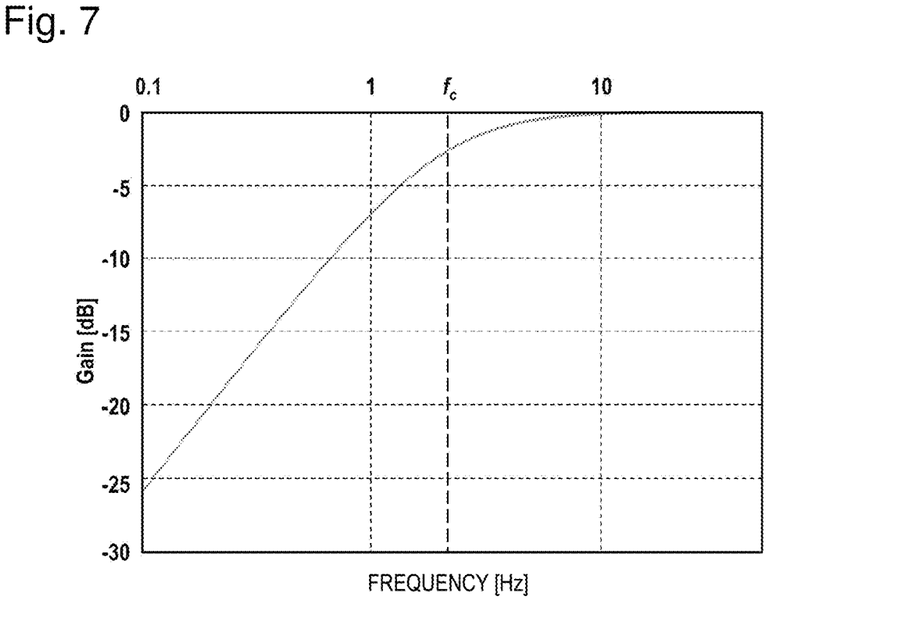
FIG. 7 is a graph illustrating a gain diagram of a transfer function $HPF(s)$ of a high-pass filter.
Figure 8:
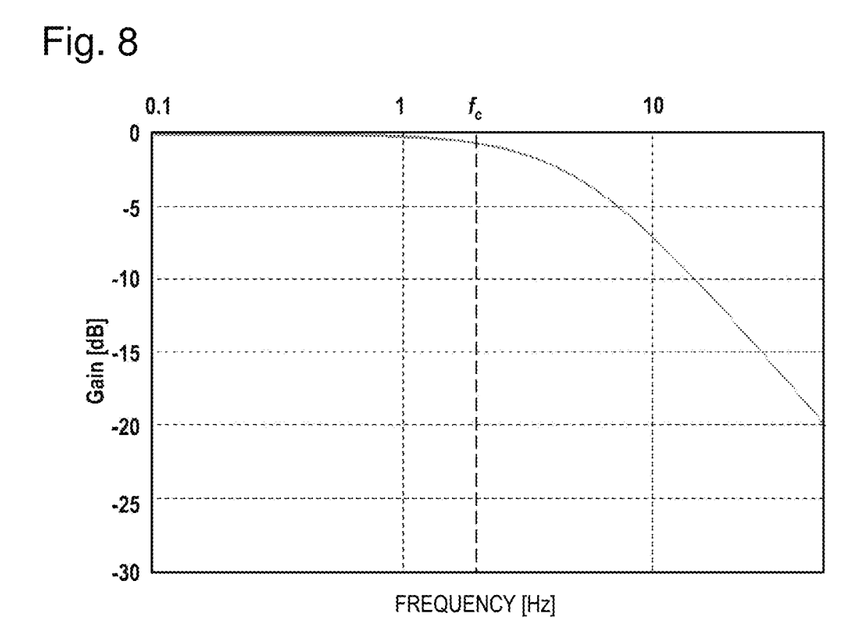
FIG. 8 is a graph illustrating a gain diagram of a nominal model $P_n(s)$.

FIG. 6 illustrates a gain diagram of the transfer function C(s) of the phase compensator 212 in the torque controller 210. FIG. 7 illustrates a gain diagram of the transfer function HPF(s) of the high-pass filter 233. FIG. 8 illustrates a gain diagram of the nominal model $P_n(s)$. In the gain diagram, the horizontal axis represents the frequency [Hz] and the vertical axis represents the gain [dB]. For example, when the phase compensator 212 having the gain characteristic of the transfer function C(s) illustrated in FIG. 6 is applied, the high frequency gain can be reduced in the gain characteristic of the nominal model $P_n(s)$ as illustrated in FIG. 8. The cutoff frequency fc in the gain diagram of the transfer function C(s) is, for example, 2 Hz or more and 10 Hz or less, and the cutoff frequency fc in the gain diagram of $P_n(s)$ is, for example, 2 Hz or more and 20 Hz or less.

The model following controller 230A is configured so that the transfer function P(s) of the control target 220 is constrained to the nominal model $P_n(s)$ in the frequency band in which the gain in the gain characteristic of Q(s)·HPF(s) is 1. The inverse plant model $P_n^{-1}(s)$ is designed to give an inverse characteristic for which constrain is desired and to take advantage of the gain characteristics of Q(s)·HPF(s). By appropriately designing $J_{mn}$ and $B_{mn}$ of the plant model, as illustrated in FIG. 8, gain characteristics of the nominal model $P_n(s)$ whose gain decreases in a high frequency region can be obtained. The frequency of the boundary between the region I and the region II (the lower limit value of the frequency range defining the region I) is the maximum frequency that can be input by the driver, and is generally about 2 Hz to 10 Hz. This frequency depends on the first cutoff frequency of the high-pass filter 233. Therefore, the lower limit frequency of the effective range of the model following control is determined by adjusting the first cutoff frequency of the high-pass filter 233 so as not to disturb the torque control.

The low-pass filter 232 and the high-pass filter 233 are coupled in series. The low-pass filter 232 may include a multistage LPF. That is, Q(s) can be expressed as a transfer function of the n-stage LPF (n is 1 or more). The second cutoff frequency is larger than the first cutoff frequency. The first cutoff frequency is, for example, 2 Hz or more and 10 Hz or less, and is preferably, for example, 5 Hz or more and 7 Hz or less. The second cutoff frequency is, for example, 3

Hz or more and preferably 50 Hz or less. However, the upper limit of the second cutoff frequency can be set to about 140 Hz to 200 Hz. The cutoff frequency fc of the gain characteristic of the nominal model $P_n(s)$ illustrated in FIG. 8 depends on the first cutoff frequency and the second cutoff frequency, and is, for example, 2 Hz or more and 20 Hz or less.

The present inventors confirmed the effect obtained by applying the model following control according to the example embodiment of the present disclosure by performing actual vehicle measurement. In the actual vehicle measurement, the effect of reducing the torque ripple and generation of the uncontrollable steering wheel by applying the model following control to the torque control was measured. Here, generation of the uncontrollable steering wheel means that the steering wheel swings left and right when the vehicle passes over a step in a state where the hands does not grip the steering wheel.

Figure 9:
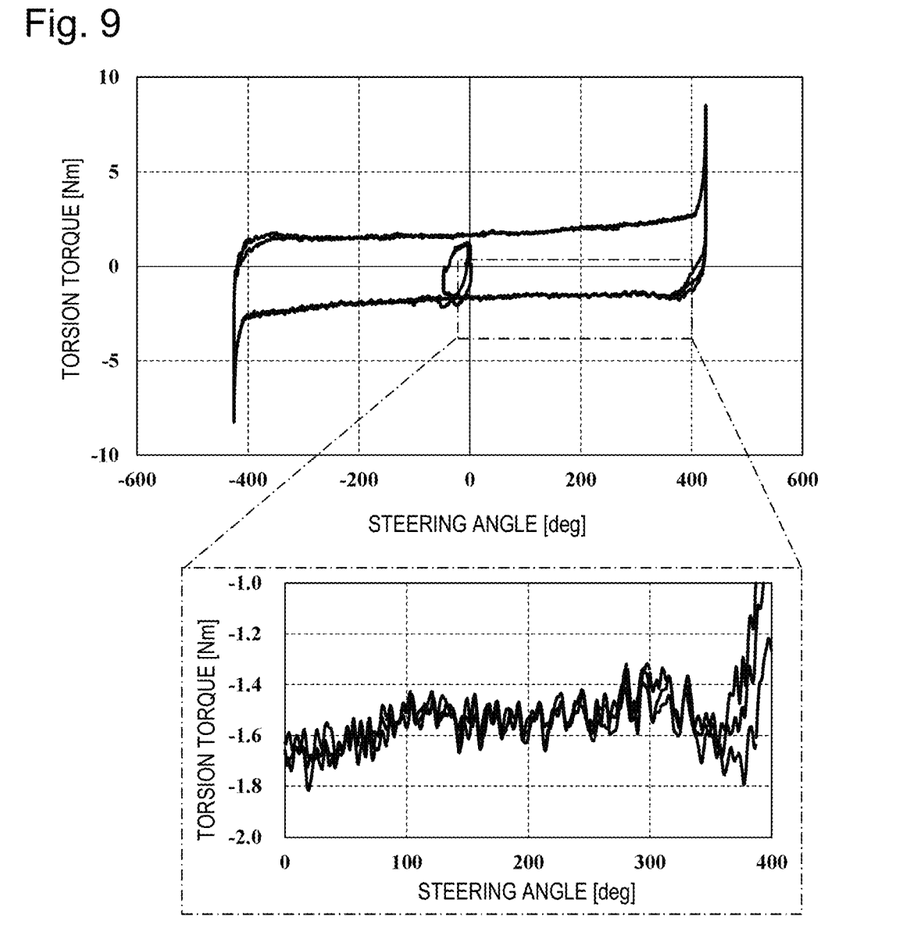
FIG. 9 is a graph illustrating measurement results of a steering angle and a torsion torque in a case where model following control is not applied.
Figure 10:
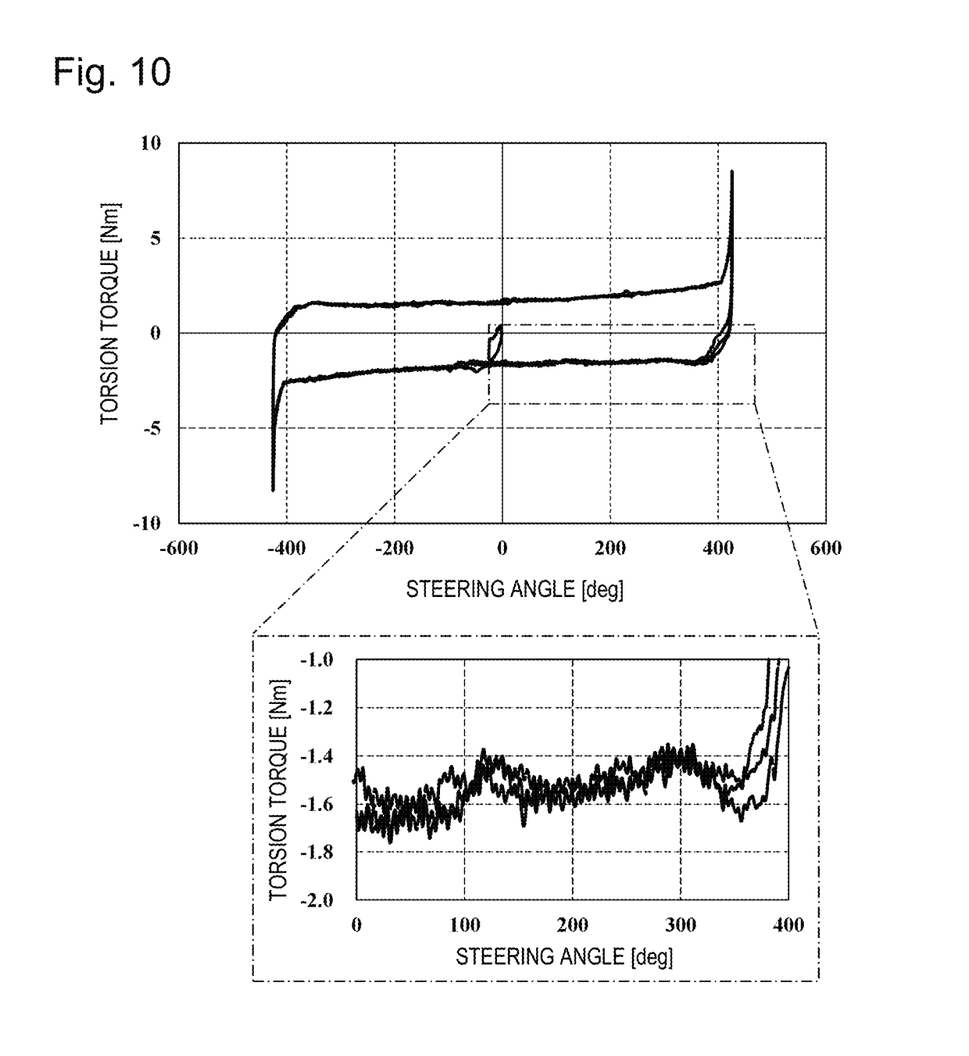
FIG. 10 is a graph illustrating measurement results of a steering angle and a torsion torque in a case where model following control is applied.

FIG. 9 illustrates measurement results of the steering angle and the torsion torque in a case where the model following control is not applied. FIG. 10 illustrates measurement results of the steering angle and the torsion torque in a case where the model following control is applied. In the graph, the horizontal axis represents the steering angle [deg] and the vertical axis represents the torsion torque [Nm]. The graph shows waveforms measured when steering is performed at an angular velocity of 180 [deg/s] from end to end (from a state where the steering wheel is fully turned to the left to a state where the steering wheel is fully turned to the right, or vice versa).

When the portion surrounded by the alternate long and short dash line of the graph is enlarged, it has been found that the torque ripple in the case where the model following control is applied can be suppressed, as compared with the case where the model following control is not applied. Specifically, it has been found that the variation amount of the torsion torque decreases by about 0.1 [Nm].

Figure 11:
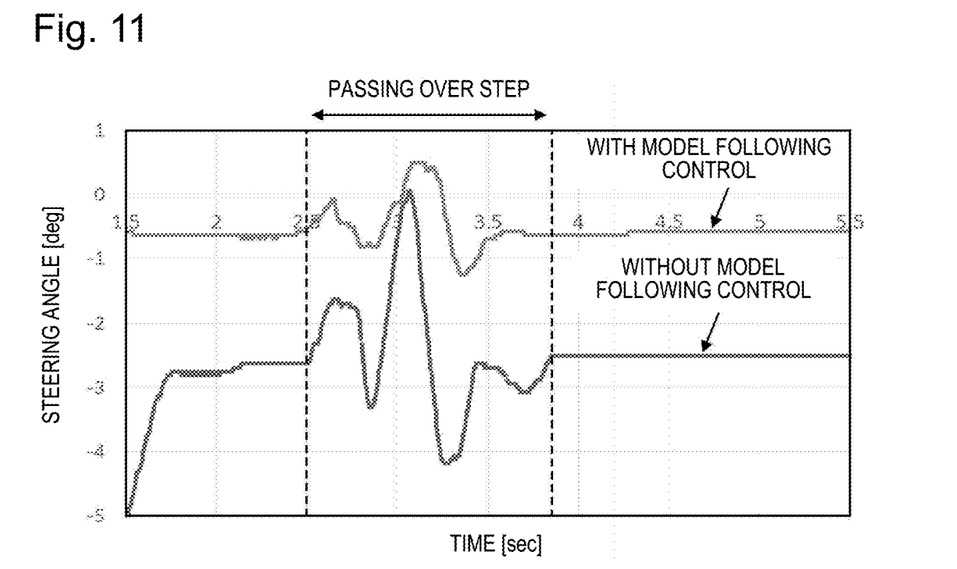
FIG. 11 is a graph illustrating a measurement result of a temporal change of a steering angle in each of a case where the model following control is not applied and a case where the model following control is applied.

FIG. 11 illustrates measurement results of the temporal change in the steering angle in each of a case where the model following control is not applied and a case where the model following control is applied. In the graph, the horizontal axis represents time [sec], and the vertical axis represents a steering angle [deg]. The region of the time when the vehicle has passed over the step is indicated by a dashed rectangle. It has been found that, by applying the model following control to the torque control, the change in the steering angle when the vehicle passes over the step is suppressed, and generation of the uncontrollable steering wheel can be appropriately reduced.

According to the first implementation example, the high frequency component of the disturbance can be reduced by applying the model following control to the torque control. As a result, it is possible to appropriately reduce the torque ripple that may occur when the vehicle is steered and generation of the uncontrollable steering wheel that may occur when the vehicle passes over the step.

Next, the model following controller according to the second implementation example will be described with reference to FIGS. 12 to 14. The model following controller according to the second implementation example is different from the model following controller according to the first implementation example in that it has a friction compensation calculator. Differences from the model following controller according to the first implementation example will be mainly described below.

Since the disturbance estimated by the model following controller includes friction of a mechanism such as a motor and a deceleration gear, the model following controller according to the second implementation example is configured to extract a friction component from the estimated disturbance torque and apply friction compensation to the estimated disturbance torque. Friction compensation is, for example, for friction of the motor, friction of the deceleration gear, or a right/left difference in friction of the deceleration gear.

When conventional friction compensation control is to be applied, when the angular velocity ω of the motor is near zero, a change in the friction compensation torque (Nm) with respect to the angular velocity ω of the motor has to be made gentle in order to prevent chattering, and as a result, highly accurate friction compensation control cannot be performed in some cases. According to the study of the inventor, in order to solve this problem, it is desirable to sequentially estimate and compensate for friction.

The model following controller according to the second implementation example is configured to feed back the disturbance compensation torque to the input to the control target. Specifically, the model following controller includes a high-pass filter that removes a low frequency component from the estimated disturbance torque, a friction compensation calculator that is coupled in parallel to the high-pass filter and applies friction compensation to the estimated disturbance torque to calculate an estimated value of the mechanical friction torque, and an adder that adds the estimated value of the friction torque to the estimated disturbance torque from which the low frequency component removed by the high-pass filter to generate a disturbance compensation torque. In the second implementation example, the estimated disturbance torque corresponds to "first correction torque", and the disturbance compensation torque corresponds to "second correction torque".

Figure 12:
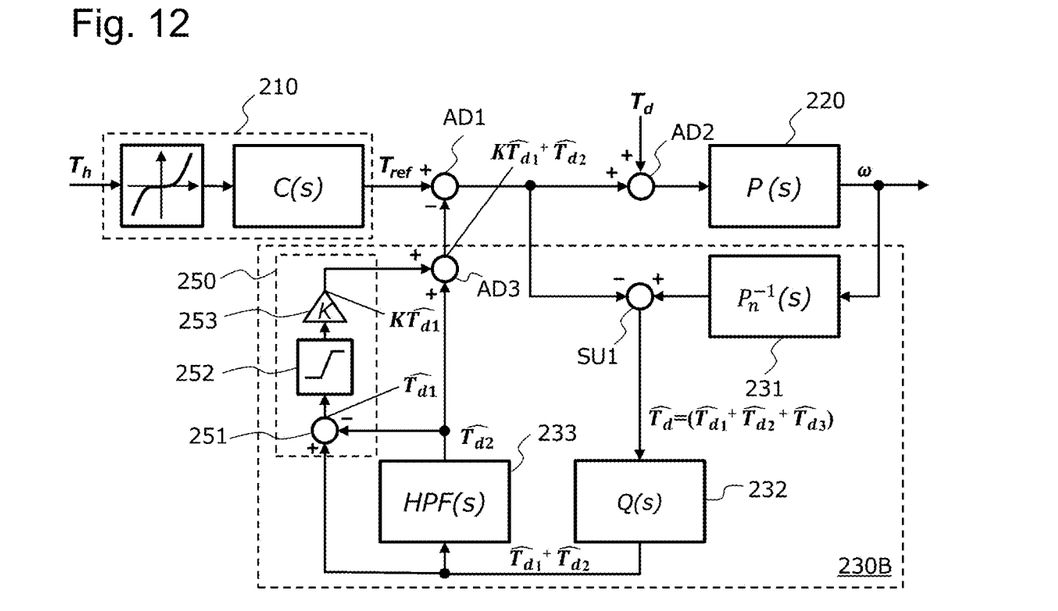
FIG. 12 is a functional block diagram illustrating a configuration example of a model following controller in the second implementation example.

FIG. 12 illustrates a configuration example of a model following controller 230B in the second implementation example. The model following controller 230B is configured to perform the model following control as in the model following controller 230A according to the first implementation example. However, the function of the model following control is not essential.

The model following controller 230B includes a friction compensation calculator 250. The friction compensation calculator 250 is coupled in parallel to the high-pass filter 233, and calculates an estimated value of the mechanical friction torque by applying friction compensation to the estimated disturbance torque $\hat{T}_d$. The friction compensation calculator 250 includes a subtractor 251, a limiter 252, and a gain adjuster 253. The subtractor 251 subtracts the output value from the high-pass filter 233 from the output value from the low-pass filter 232. The limiter 252 limits the output value from the subtractor 251. When the input value exceeds the upper limit or lower limit threshold value, the limiter 252 clips the input value to the upper limit or lower limit threshold value.

The gain adjuster 253 multiplies the output value from the limiter 252 by the gain K. The maximum value of the gain K of the gain adjuster 253 is determined under the condition that the transfer function of the control target 220 is constrained to the nominal model. The maximum value of the gain K is set to, for example, about 1 to 1.2.

The estimated disturbance torque $\hat{T}_d$ includes mechanical friction. In the estimation of the disturbance, the friction is first estimated from the transmission path of the output torque of the motor, and then the torque acting on the motor such as the self-aligning torque is estimated. Therefore, the friction compensation calculator 250 calculates a value corresponding to the friction torque in the disturbance estimated first as an estimated value of the friction torque. In general, since appropriate friction is required for the EPS, it is possible to realize highly accurate friction compensation while maintaining appropriate frictional force by setting a value smaller than the frictional force actually acting to an estimated value of the friction torque.

In order to apply friction compensation to the estimated disturbance torque used for the model following control, it is necessary to pay attention to the stability condition of the model following control. This condition is that the gain in the gain characteristic of the transfer function of the friction compensation calculator 250 constrained to the characteristic in which the stability is considered does not exceed 1 based on the above-described small gain theorem. This is derived from the design condition of the low-pass filter 232. In the second implementation example, the subtractor 251 is provided in a stage before the limiter 252 so that the value of the friction compensation gain, that is, the gain K, is set to 1 at maximum so as to constantly satisfy this condition, and the gain in the gain characteristic is set to 1 under this condition, and the subtraction processing is applied. In other words, the friction compensation calculator 250 behaves as a low-pass filter having a transfer function of 1-HPF(s).

The estimated disturbance torque $\hat{T}_d$ includes a low frequency component $\hat{T}_{d1}$, a medium frequency component $\hat{T}_{d2}$, and a high frequency component $\hat{T}_{d3}$. The low-pass filter 232 removes the high frequency component $\hat{T}_{d3}$ from the estimated disturbance torque $\hat{T}_d$, and the high-pass filter 233 further removes the low frequency component $\hat{T}_{d1}$ from the estimated disturbance torque $\hat{T}_d$. As described above, friction compensation is only for the medium frequency component $\hat{T}_{d2}$ of the estimated disturbance torque in the range from the first cutoff frequency of the high-pass filter 233 to the second cutoff frequency of the low-pass filter 232. However, since the assumed friction included in the disturbance is a low frequency component of the disturbance, the low frequency component $\hat{T}_{d1}$ is not subject to friction compensation according to the filtering process described above. Therefore, by coupling the friction compensation calculator 250 in parallel to the high-pass filter 233, the low frequency component $\hat{T}_{d1}$ of the disturbance that has been subjected to the filtering process by the high-pass filter 233 and is no longer compensated is added again to the estimated disturbance torque $\hat{T}_d$, thereby realizing friction compensation. More specifically, the friction compensation calculator 250 adds a value obtained by multiplying the low frequency component $\hat{T}_{d1}$ by the gain K to the medium frequency component $\hat{T}_{d2}$ to generate the disturbance compensation torque. Note that "$\hat{T}_{d1}$" means $T_{d1}$ with the hat illustrated in FIG. 12, "$\hat{T}_{d2}$" means $T_{d2}$ with the hat illustrated in FIG. 12, and "$\hat{T}_{d3}$" means $T_{d3}$ with the hat illustrated in FIG. 12.

A vehicle equipped with the EPS is capable of traveling according to a travel mode having an automatic driving mode and a manual driving mode. In this case, the gain K of the gain adjuster 253 may be switched according to the travel mode. The greater the gain K, the greater the degree of friction reduction. The gain K set in the automatic driving mode is preferably larger than the gain K set in the manual driving mode. As a result, it is possible to apply optimum friction compensation to an automatic driving mode in which a reduction in friction is more required.

The model following controller 230B further includes an adder AD3. The adder AD3 adds the output value from the gain adjuster to the output value from the high-pass filter 233. The output from the adder AD3 is fed back to the input to the control target 220 as a disturbance compensation torque.

An auxiliary device that recognizes a lane such as a white line or a yellow line when traveling on an expressway and assists automatic traveling of a vehicle following the lane has been developed. It is known that, in a vehicle equipped with an EPS and an auxiliary device, when there is a right/left difference in friction of a deceleration gear, the control of the auxiliary device that causes the vehicle to travel straight along the center of a lane can be affected. According to the friction compensation control according to the example embodiment of the present disclosure, even in a case where there is a right/left difference in friction of the deceleration gear, it is possible to sequentially calculate an estimated value of the friction torque, and thus, it is possible to solve the above problem. Note that the angular velocity ω of the motor, which is the output of the plant model, includes information on a right/left difference in friction of the deceleration gear.

The present inventors confirmed the effect obtained by applying the friction compensation control by the gain adjustment through simulation. The effect of reducing friction by friction compensation control was measured by simulation.

Figure 13:
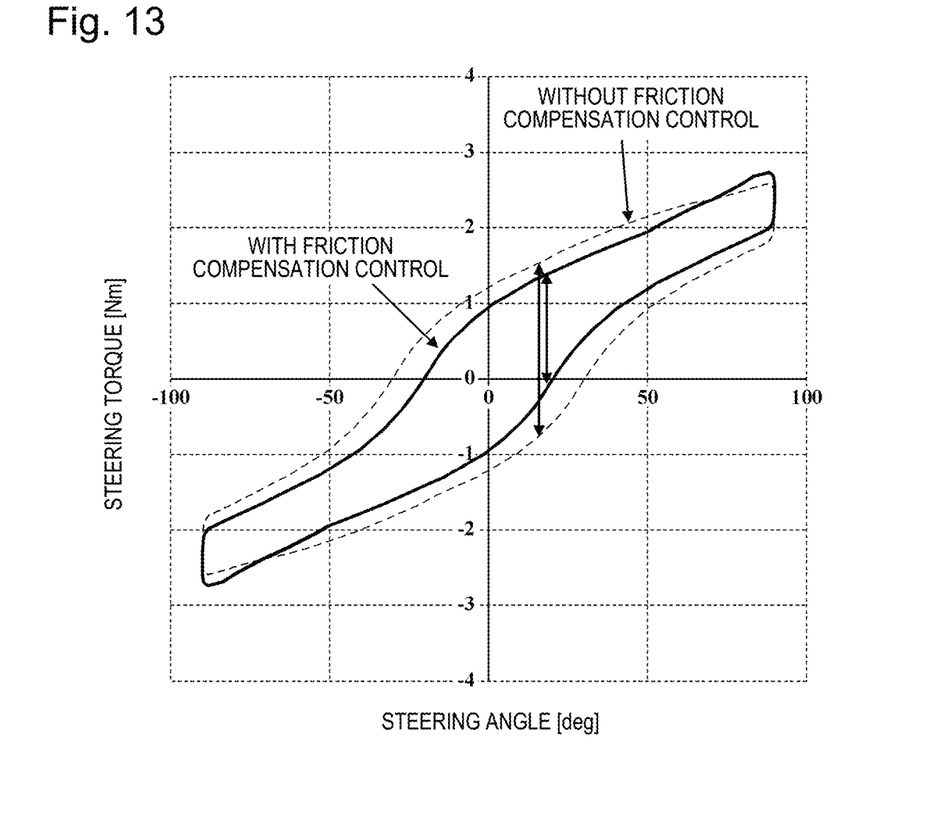
FIG. 13 is a graph illustrating simulation results of a steering angle and a steering torque in each of a case where friction compensation control is not applied and a case where friction compensation control is applied.

FIG. 13 illustrates the simulation result of the steering angle and the steering torque in each of a case where the friction compensation control by gain adjustment is not applied and a case where the friction compensation control by gain adjustment is applied. In the graph, the horizontal axis represents the steering angle [deg], and the vertical axis represents the steering torque [Nm]. A graph indicated by a broken line indicates a waveform when the friction compensation control is not applied, and a graph indicated by a solid line indicates a waveform when the friction compensation control is applied. An arrow in the drawing indicates the width of the steering torque, and the width corresponds to the magnitude of friction. It has been found that friction can be appropriately reduced by applying friction compensation control.

Figure 14:
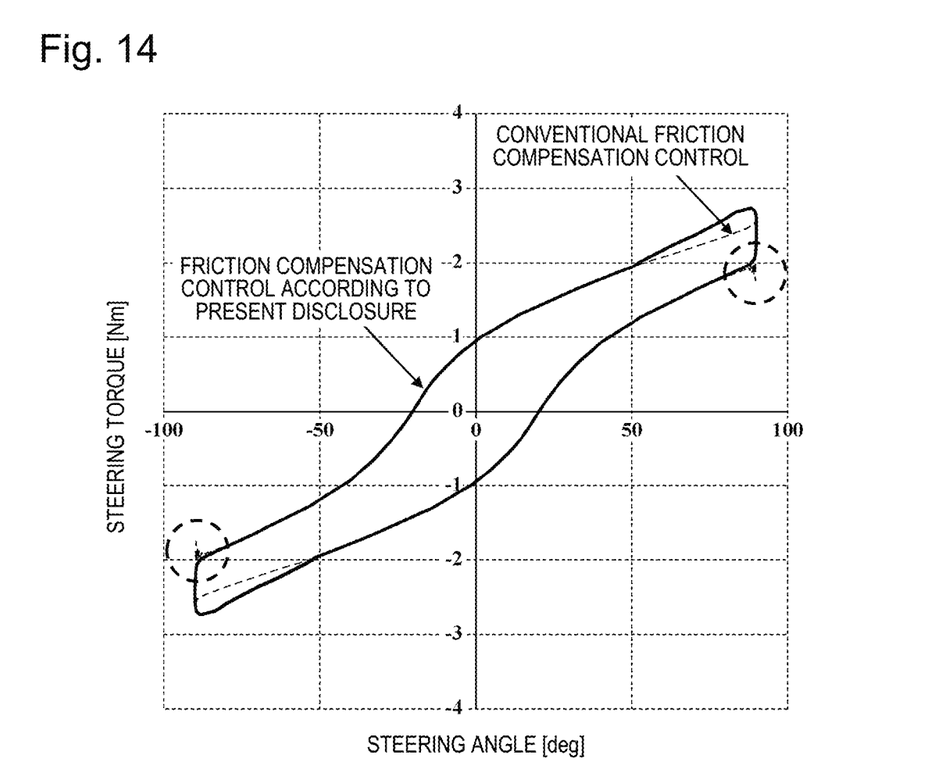
FIG. 14 is a graph illustrating simulation results of a steering angle and a steering torque in each of a case where the conventional friction compensation control is applied and a case where the friction compensation control according to the second implementation example is applied.

FIG. 14 illustrates the simulation result of the steering angle and the steering torque in each of a case where the conventional friction compensation control is applied and a case where the friction compensation control by gain adjustment is applied. In the graph, the horizontal axis represents the steering angle [deg], and the vertical axis represents the steering torque [Nm]. A graph indicated by a broken line indicates a waveform when the conventional friction compensation control is applied, and a graph indicated by a solid line indicates a waveform when the friction compensation control by gain adjustment is applied. According to the conventional friction compensation control, as described above, when the angular velocity ω of the motor is near zero, the change in the friction compensation torque (Nm) with respect to the angular velocity ω of the motor has to be made gentle in order to prevent chattering. Due to this, a spike was observed in the steering torque when turning the steering wheel over (see the portion surrounded by the dashed circle in the figure). On the other hand, when the friction compensation control by gain adjustment was applied, no spike was confirmed, and it was found that the friction was appropriately reduced.

According to the second implementation example, by further applying friction compensation control by gain adjustment to torque control, it is possible to appropriately reduce friction while reducing a high frequency component of disturbance.

In the third implementation example, the control target includes a steering wheel 521, universal joints 523A and 523B, a rotation shaft 524, a torsion bar 546, a motor 543, and a deceleration gear 544. Since the control target in the third implementation example includes portions that can rotate relative to each other via the torsion bar 546, the motion of the control target cannot be described only by a simple equation of motion of the one-inertia system. The control target in the third implementation example changes between the one-inertia system and the two-inertia system depending on the strength with which the driver of the vehicle grips the steering wheel 521. The stronger the driver grips the steering wheel 521, the closer the control target is to the 1-inertia system. The weaker the driver grips the steering wheel, the closer the control target is to the two-inertia system. In the third implementation example, an angular velocity corresponding to the angular velocity of the deceleration gear 544 is input to the model following controller as an output of the control target.

In the third implementation example, the plant model (nominal model) is a model having frequency characteristics between the one-inertia system and the two-inertia system. The transfer function $P_n(s)$ of the plant model (nominal model) in the third implementation example is expressed by the mathematical expression of Math. 7, and the transfer function $P_n^{-1}(s)$ of the inverse plant model is expressed by the mathematical expression of Math. 8.

$$\frac{1}{J_{STG_n}s + B_{STG_n}} \frac{s^2 + 2\zeta_{1n}\omega_{1n}s + \omega_{1n}^2}{s^2 + 2\zeta_{2n}\omega_{2n}s + \omega_{2n}^2} \quad [\text{Math. 7}]$$

$$J_{STG_n}s + B_{STG_n}\left(\frac{s^2 + 2\zeta_{2n}\omega_{2n}s + \omega_{2n}^2}{s^2 + 2\zeta_{1n}\omega_{1n}s + \omega_{1n}^2}\right) \quad [\text{Math. 8}]$$

In the mathematical expression of Math. 7 and the mathematical expression of Math. 8, s is a Laplace transformer, $J_{STG_n}$ is a parameter representing the inertia moment of the nominal model, $B_{STG_n}$ is a parameter representing the viscous friction coefficient of the nominal model, Win is the frequency of the zero point of the transfer function $P_n(s)$, $\omega_{2n}$ is the frequency of the pole of the transfer function $P_n(s)$, $\zeta_{1n}$ is the damping ratio at the zero point of the transfer function $P_n(s)$, and $\zeta_{2n}$ is the damping ratio at the pole of the transfer function $P_n(s)$.

In the third implementation example, the nominal model is a model having frequency characteristics between the one-inertia system and the two-inertia system. The mathematical expression of Math. 7 expressing the transfer function $P_n(s)$ of the nominal model is an expression obtained by adding an attenuation term to an expression representing the two-inertia system. In the mathematical expression of Math. 7, the attenuation terms are $2\zeta_{1n}\omega_{1n}s$ and $2\zeta_{2n}\omega_{2n}s$. The expression obtained by removing these attenuation terms from the mathematical expression of Math. 7 is an expression representing the two-inertia system. In the third implementation example, the degree of the transfer function $P_n(s)$ of the nominal model is 3.

In the third implementation example, the nominal model is a model in which mechanical characteristics when a driver (steering person) steers the steering wheel 521 are considered. The control target approaches the one-inertia system as the driver strongly grips the steering wheel 521, and approaches the two-inertia system as the driver weakly grips the steering wheel 521. Therefore, the transfer function P(s) of the control target in the third implementation example changes between the one-inertia system and the two-inertia system depending on how a force is applied from the driver's arm to the steering wheel 521. In the third implementation example, by setting the nominal model as a model having frequency characteristics between the one-inertia system and the two-inertia system, it is possible to prevent the modeling error $\Delta(s)$ between the transfer function $P_n(s)$ of the nominal model and the transfer function P(s) of the control target from becoming too large regardless of the state of the control target between the one-inertia system and the two-inertia system. Therefore, the control target can be suitably controlled using the nominal model regardless of how the driver steers the steering wheel 521. As described above, in the third implementation example, the nominal model is a model in consideration of mechanical characteristics given to the control target by the way the driver grips the steering wheel 521. The control device 100 in the third implementation example can suitably control the control target by having such a nominal model as an internal model. Other configurations in the third implementation example can be similar to those in the other implementation examples described above.

Note that the control device of each implementation example described above includes a torque controller that gives an input to a control target that is a motor, but is not limited thereto. The control device according to the present disclosure may not include the torque controller.

The example embodiments of the present disclosure can be used for a motor control device for controlling an EPS mounted on a vehicle.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control device usable in an electric power steering device including a motor to control the motor, the control device comprising:
   a model following controller to generate a correction torque based on an output from a control target that is the motor and that correct an input to the control target with the correction torque; wherein
   the model following controller:
      includes a high-pass filter with a first cutoff frequency and a low-pass filter with a second cutoff frequency higher than the first cutoff frequency; and
      is configured or programmed so that a transfer function of the control target is constrained to a nominal model in a frequency band in which a gain in a gain characteristic of Q(s)·HPF(s) is 1 where Q(s) is a transfer function of the low-pass filter and HPF(s) is a transfer function of the high-pass filter.

2. The control device according to claim 1, wherein the first cutoff frequency is about 2 Hz or more and about 10 Hz or less.

3. The control device according to claim 2, wherein the second cutoff frequency is about 3 Hz or more.

4. A motor module comprising:
   a motor; and
   the control device according to claim 1.

5. An electric power steering device comprising the motor module according to claim 4.

6. A computer-implemented method for controlling a motor of an electric power steering device including the motor, the method comprising:

generating a correction torque based on an output from a control target and correcting an input to the control target with the correction torque using a model following controller that constrains a transfer function of the control target that is the motor to a nominal model in a frequency band in which a gain in a gain characteristic of $Q(s) \cdot HPF(s)$ is 1, the model following controller including a high-pass filter with a first cutoff frequency and a low-pass filter with a second cutoff frequency larger than the first cutoff frequency, where $Q(s)$ is a transfer function of the low-pass filter and $HPF(s)$ is a transfer function of the high-pass filter.

* * * * *